United States Patent
Sone

(10) Patent No.: US 9,894,231 B2
(45) Date of Patent: Feb. 13, 2018

(54) IMAGE-FORMING DEVICE HAVING A PLURALITY OF PAPER-SUPPLY STAGES

(71) Applicant: KYOCERA Document Solutions Inc., Osaka (JP)

(72) Inventor: Daiki Sone, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/432,773

(22) Filed: Feb. 14, 2017

(65) Prior Publication Data
US 2017/0257509 A1 Sep. 7, 2017

(30) Foreign Application Priority Data
Mar. 2, 2016 (JP) .................................. 2016-039662

(51) Int. Cl.
*H04N 1/00* (2006.01)
*G03G 15/00* (2006.01)

(52) U.S. Cl.
CPC ....... *H04N 1/00954* (2013.01); *G03G 15/553* (2013.01); *G03G 15/6508* (2013.01); *H04N 1/00623* (2013.01); *H04N 1/00644* (2013.01); *H04N 1/00925* (2013.01); *G03G 2215/00729* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2007/0070388 A1* | 3/2007 | Yamada | ............. | G03G 15/6538 358/1.14 |
| 2007/0277087 A1* | 11/2007 | Matsuda | ............. | G03G 15/5004 715/235 |
| 2013/0214603 A1* | 8/2013 | Tanaka | ....................... | H02J 9/04 307/66 |
| 2015/0241820 A1* | 8/2015 | Ishikura | ................. | G03G 15/80 399/70 |

FOREIGN PATENT DOCUMENTS

| | | |
|---|---|---|
| JP | H07-250190 A | 9/1995 |
| JP | H07-250190 A | 9/1995 |
| WO | WO2014175336 A1 | 10/2014 |

* cited by examiner

*Primary Examiner* — John Wallace
(74) *Attorney, Agent, or Firm* — Hawaii Patent Services; Nathaniel K. Fedde; Kenton N. Fedde

(57) ABSTRACT

Provided is an image-forming device that improves convenience for a user. The image-forming device includes a plurality of power-supply stages, remaining paper amount detection sensors, and a system control unit. A remaining paper amount detection sensor detects the remaining paper amount in a paper-supply stage. When the remaining paper amount that is detected by the remaining paper amount detection sensor is less than a fixed value, the system control unit sets the paper-supply stage having a paper amount that is less than the fixed value as a FAX use only paper-supply stage.

5 Claims, 4 Drawing Sheets

| PAPER-SUPPLY CASSETTE | FAX USE ONLY PAPER-SUPPLY TIER ON/OFF SETTING | REMAINING PAPER AMOUNT SETTING VALUE FOR SETTING A FAX USE ONLY PAPER-SUPPLY TIER |
|---|---|---|
| PAPER-SUPPLY CASSETTE (112a) | ON | 50% |
| PAPER-SUPPLY CASSETTE (112b) | ON | 80% |
| PAPER-SUPPLY CASSETTE (112c) | OFF | % |
| PAPER-SUPPLY CASSETTE (112d) | OFF | % |

FIG. 3

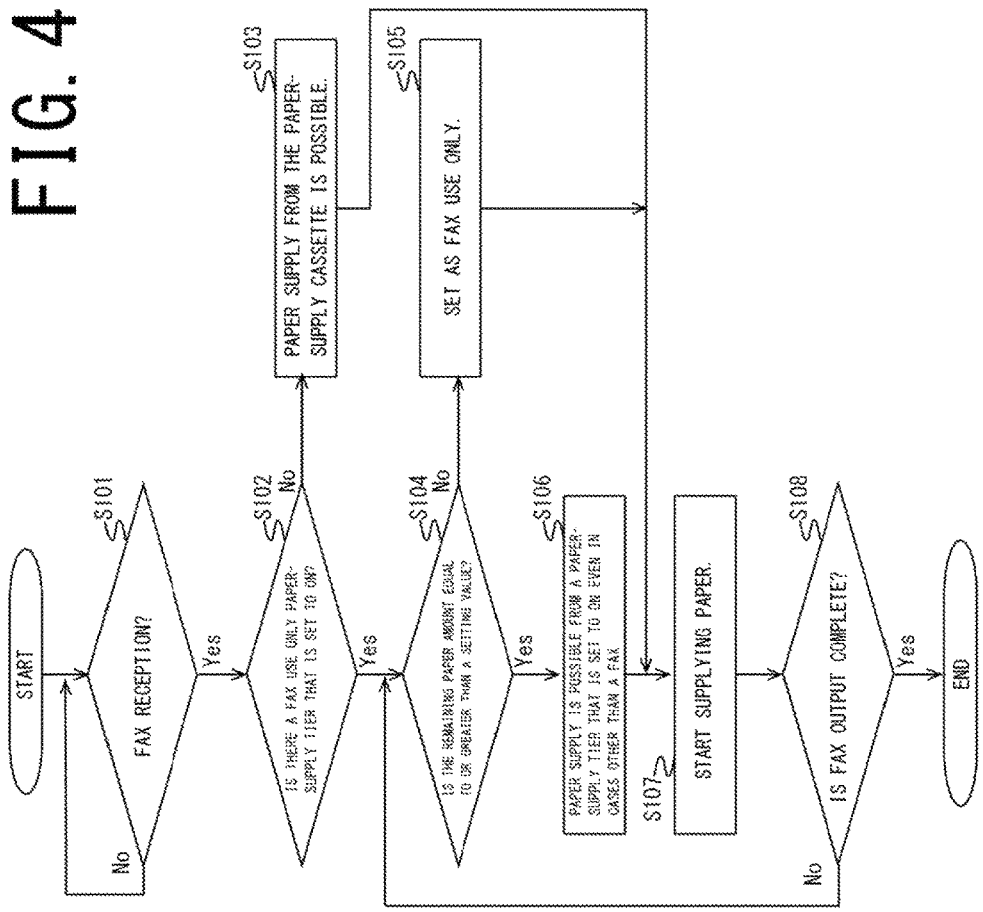

IMAGE-FORMING DEVICE HAVING A PLURALITY OF PAPER-SUPPLY STAGES

INCORPORATION BY REFERENCE

This application is based on and claims the benefit of priority from Japanese Patent Application No. 2016-039662 filed on Mar. 2, 2016, the contents of which are hereby incorporated by reference.

BACKGROUND

The present disclosure relates to an image-forming device having a plurality of paper-supply stages.

For example, an MFP type of image-forming device such as a printer, multi-function printer, multi-function machine, is provided with a copying function, a FAX function, a data transmission/reception function for transmitting or receiving data via a network, and the like. Moreover, taking user convenience into consideration, an image-forming device is also provided with paper-supply cassettes for storing paper of various paper sizes and different paper types.

Incidentally, in such an image-forming device, the FAX function operates automatically when receiving a FAX, for example. However, when receiving a FAX and paper in a paper-supply cassette runs out due to use during printing or copying, it is not possible to print and output paper. Therefore, in order that paper in a paper-supply cassette does not run out, it is necessary to always supply paper to the paper-supply cassettes, which can become inconvenient.

As a typical image-forming device for eliminating such inconvenience, a copy machine with a facsimile function has been proposed in which a paper-supply cassette is specified from among a plurality of paper-supply cassettes as a cassette for FAX use only, and paper is supplied from other paper-supply cassettes for printing and copying.

In the typical copy machine with a facsimile function described above, a paper-supply cassette is specified from among a plurality of paper-supply cassettes as a cassette for FAX use only, so it is possible to eliminate inconvenience by reducing the frequency of supplying paper.

SUMMARY

The image-forming device of this disclosure includes a plurality of paper-supply stages, remaining paper amount detection sensors, and a system control unit. The remaining paper amount detection sensors detect the amounts of paper in the paper-supply stages. When a remaining paper amount that was detected by a remaining paper amount detection sensor is less than a setting value, the system control unit sets the paper-supply stage having an amount that is less than the setting value as a FAX use only paper-supply stage.

BRIEF DESCRIPTION OF THE DRAWINGS

FIG. 3 explains setting the FAX use only paper-supply stage by the system control unit in FIG. 2.

FIG. 4 illustrates the paper-supply control step by the system control unit in FIG. 2.

DETAILED DESCRIPTION

An embodiment of the image-forming device of the present disclosure will be explained below with reference to FIG. 1 to FIG. 4. An MFP that is a multifunctional peripheral provided with a printing function, a copying function, a FAX function, a data transmission/reception function for transmitting and receiving data via a network, and the like is used as an example of an image-forming device in the explanation below.

Figure 1:
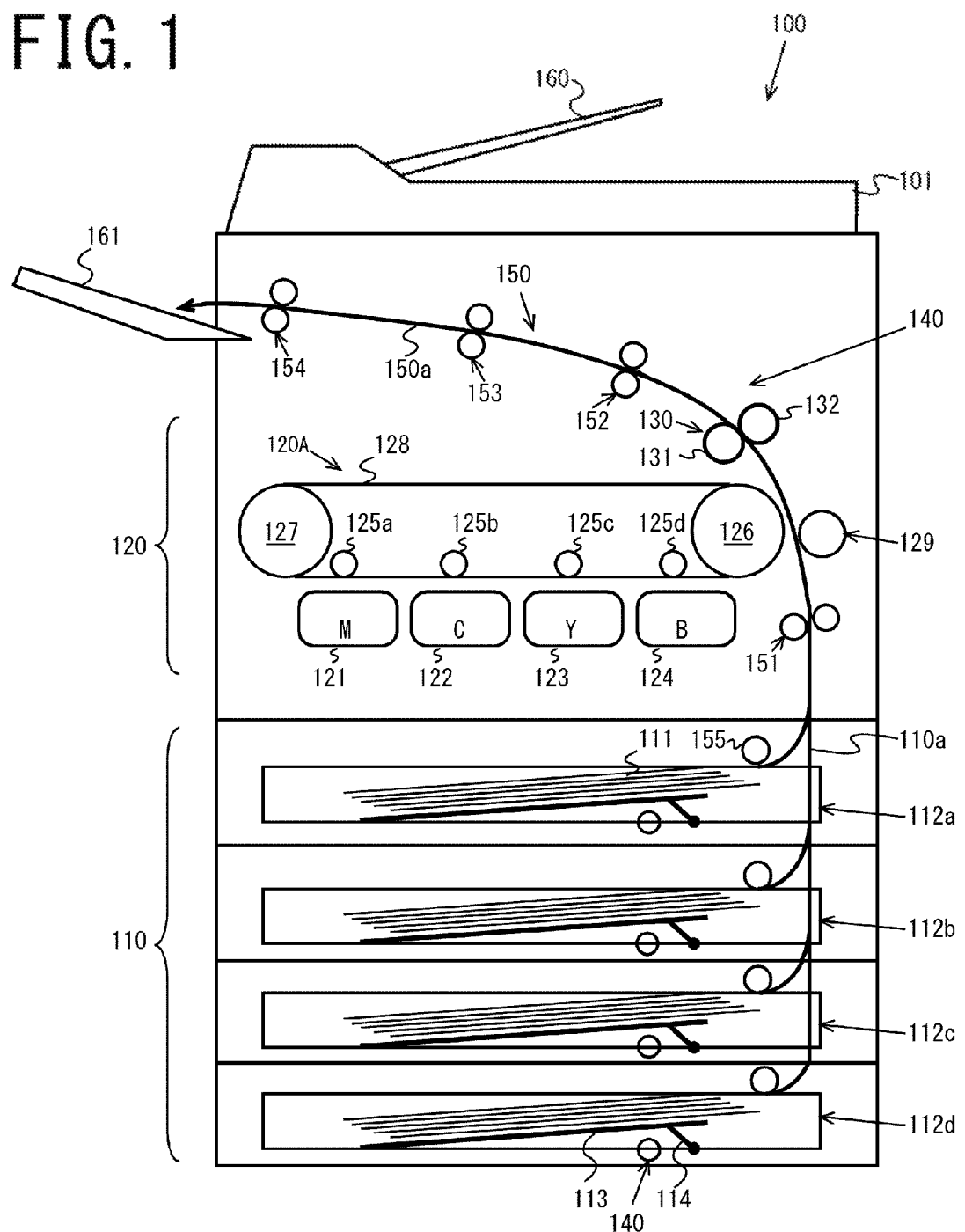
FIG. 1 illustrates the configuration of the image-forming device of the present disclosure.

First, as illustrated in FIG. 1, a paper-supply unit 110, an image-forming unit 120, a fixing unit 130, remaining paper amount detection sensors 140, a transporting unit 150 and the like are provided inside a main unit 101 of an MFP 100. Reference number 160 indicates a paper-supply unit and reference number 161 indicates a paper-output tray.

The paper-supply unit 110 houses a plurality of paper-supply cassettes 112*a* to 112*d* that are able to store paper 111 having various different paper sizes and paper types. As paper types it is possible to use normal paper, OHP sheets, pre-printed paper, recycled paper, thin paper, thick paper, high-quality paper and the like. Moreover, each of the respective paper-supply cassettes 112*a* to 112*d* has a lifting plate 113 that lifts the paper 111 up, and a push-up member 114 that pushes up one-end-section side of the lifting plate 113. When the push-up member 114 pushes up the one-end-section side of the lifting plate 113, one-end-section side of the paper 111 comes in contact with a feeding roller 155 on the main unit 101 side. Then, the feeding roller 155 feeds paper 111 one sheet at a time to a common transporting path 110*a* that is provided in each of the respective paper-supply cassettes 112*a* to 112*d*.

The image-forming unit 120 has a printer unit 120A and a fixing unit 130. The printer unit 120A includes an image-forming unit (M) 121, an image-forming unit (C) 122, an image-forming unit (Y) 123 and an image-forming unit (B) 124 that have a photosensitive drum, a developing device, a charging device, an exposing device and the like. The image-forming unit (M) 121 is for magenta, the image-forming unit (C) 122 is for cyan, the image-forming unit (Y) 123 is for yellow, and the image-forming unit (B) 124 is for black.

Moreover, the printer unit 120A has primary transfer rollers 125*a* to 125*d*, a drive roller 126, a follower roller 127, an intermediate transfer belt 128 and a secondary roller 129. The image-forming unit (M) 121, image-forming unit (C) 122, image-forming unit (Y) 123 and image-forming unit (B) 124 form toner images on respective photosensitive drums by a charging, exposing and developing process based on printing data. Then, the primary transfer rollers 125*a* to 125*d* transfer the toner images on the photosensitive drums to the intermediate transfer belt 128 that extends around the drive roller 126 and follower roller 127. The secondary transfer roller 129 presses from the rear surface side of the paper 111 and transfers the toner images on the intermediate transfer belt 128 to the front surface side of the paper 111.

The fixing unit 130 has a heating roller 131 and a pressure roller 132. The heating roller 131 applies heat to the paper 111 from a heat source that is controlled by a heat-source-control unit. The pressure roller 132 presses the paper 111 toward the heating roller 131 side. The fixing unit 130 applies pressure by way of the pressure roller 132 and heat by way of the heating roller 131 to the paper 111 to which toner images have been transferred by the drive roller 126 and secondary transfer roller 129. As a result, the toner images are fixed to the paper 111.

The remaining paper amount detection sensors 140 detect the remaining amounts of paper 111 stored in the each of the paper-supply cassettes 112*a* to 112*d*. The remaining paper amount detection sensors 140 detect the remaining amounts of paper 111 from the amounts that the respective push-up members 114 of the paper-supply cassettes 112a to 112d have been pushed up, or from the amounts of incline of the respective lifting plates 113. It is possible to use existing optical type sensors as the remaining paper amount detection sensors 140.

The transporting unit 150 has transporting-roller units 151 to 154. Each of the transporting-roller units 151 to 154 has a driving roller and a following roller. The transporting-roller units 151 to 154 are arranged on a transporting path 150a that extends from a common transporting path 110a to a paper-output tray 161. The image-forming unit 120 described above is arranged between the transporting-roller units 151 and 152. When printing is set, for example, the paper 111 is transported along the transporting path 150a from the common transporting path 110a and output to the paper-output tray 161 by driving the transporting-roller units 151 to 154. When the paper 111 is transported along the transporting path 150a, the toner images are transferred by the secondary transfer roller 129 of the image-forming unit 120, and the toner images are fixed by the heating roller 131 and pressure roller 132 of the fixing unit 130.

Figure 2:
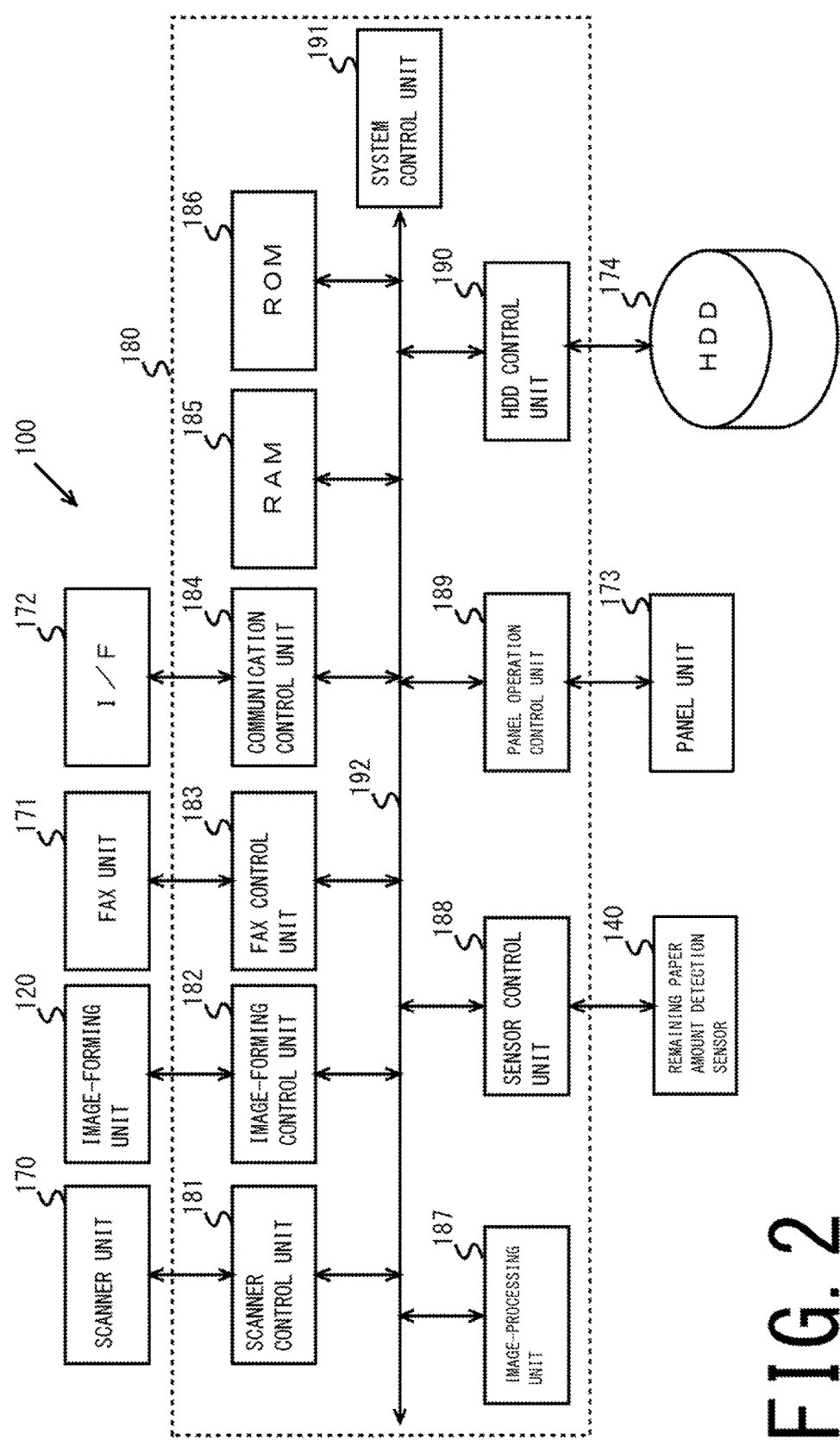
FIG. 2 illustrates an example of the internal configuration of the MFP in FIG. 1.

Next, an example of the configuration of the control system of the MFP 100 will be explained with reference to FIG. 2. The MFP 100 includes a control unit 180 that controls a scanner unit 170, an image-forming unit 120, a FAX unit 171, an I/F 172, remaining paper amount sensors 140, a panel unit 173, and an HDD 174.

The scanner unit 170 is a device that converts a manuscript image that is read by an image sensor into digital image data, and inputs that data to the control unit 180. The image-forming unit 120 is a device that prints an image on paper 111 based on printing data that is outputted from the control unit 180. The FAX unit 171 is a device that transmits data that is outputted from the control unit 180 to a facsimile of another party by way of telephone lines, and receives data from a facsimile of another party and inputs that data to the control unit 180.

The I/F 172 is a device such as a network interface card that is responsible for communication with other user terminals, contents servers, web servers and the like byway of an in-house LAN, the Internet and the like. The panel unit 173 is a device such as a touch panel that performs displays for the copying function, FAX function, transmission and reception function for transmitting or receiving data by way of a network, and for various settings. The HDD 174 is a storage device that stores application programs and the like of providing the various functions of the MFP 100.

The control unit 180 is a processor that controls the overall operation of the MFP 100 by executing an image-forming program, control program and the like. The control unit 180 includes a scanner control unit 181, an image-forming control unit 182, a FAX control unit 183, a communication control unit 184, RAM 185, ROM 186, an image-processing unit 187, a sensor control unit 188, a panel operation control unit 189, an HDD control unit 190, and a system control unit 191. Moreover, these are connected to a database 192.

The scanner control unit 181 controls the reading operation of the scanner unit 170. The image-forming control unit 182 controls the printing operation of the image-forming unit 120. The FAX control unit 183 controls the data transmission and reception operation of the FAX unit 171. The communication control unit 184, by way of the I/F 172, controls transmission and reception of data and the like via a network.

The RAM 185 is a work memory for executing programs. Moreover, the RAM 185 stores printing data that has undergone image processing by the image-processing unit 187. The ROM 186 stores a control program that checks the operation of all of the units. The image-processing unit 187 performs image processing on the image data that is read by the scanner unit 170.

The sensor control unit 188 controls the detection operation of the remaining paper amount detection sensors 140. Moreover, the sensor control unit 188 notifies the system control unit 191 of the amounts of paper remaining in the paper-supply cassettes 112a to 112d that were detected by the remaining paper amount detection sensors 140.

The panel operation control unit 189 controls the display operation of the panel unit 173. Moreover, the panel operation control unit 189, by way of the panel unit 173, receives start instructions for printing, copying, FAX, data transmission or reception via a network and the like. Moreover, the panel operation control unit 189, by way of the panel unit 173, receives an ON/OFF setting for the FAX use only paper-supply stage, and a setting value for the remaining amount of paper that enables the ON setting for the FAX use only paper-supply stage, and notifies the system control unit 191. The ON/OFF setting for the FAX use only paper-supply stage, and the setting value for the remaining amount of paper that enables the ON setting for the FAX use only paper-supply stage will be described later. The HDD control unit 190 controls the reading of data from and writing of data to the HDD 174.

The system control unit 191 controls coordinated operation of each of the units. Mainly, the system control unit 191 controls paper supply from the paper-supply cassettes 112a to 112d when receiving a FAX based on the ON/OFF setting for the FAX use only paper-supply stage and the setting value for the remaining amount of paper that enables the ON setting for the FAX use only paper-supply stage that were received by the panel operation control unit 189, and controls the paper supply from the paper-supply cassettes 112a to 112d when printing or copying.

Next, the ON/OFF setting for the FAX use only paper-supply stage and the setting value for the remaining paper amount that enables the ON setting for the FAX use only paper-supply stage will be explained with reference to FIG. 3.

First, in the ON/OFF setting for the FAX use only paper-supply stage, when setting a paper-supply cassette 112a to 112d to be a FAX use only paper-supply stage, either ON or OFF is set using the panel unit 173. FIG. 3 illustrates the case in which the paper-supply cassettes 112a and 112b are set to be ON, and the paper-supply cassettes 112c and 112d are set to be OFF.

Moreover, the setting value for the remaining paper amount that enables the ON setting for the FAX use only paper-supply stage is set using the panel unit 173. FIG. 3 illustrates the case in which the setting value for the remaining paper amount is set to 50% for paper-supply cassette 112a, and the setting value for the remaining paper amount is set to 80% for paper-supply cassette 112b. In other words, for paper-supply cassette 112a, the FAX use only paper-supply stage setting is set to ON, so when the remaining paper amount becomes 50% or less, paper-supply cassette 112a will become a FAX use only paper-supply stage. That is, paper-supply cassette 112a does not become a FAX use only paper-supply stage until the remaining amount of paper become 50% or less, and can be used for supplying paper for a FAX, printing and copying. In this embodiment, the setting value of the remaining paper amount is illustrated as being a percentage of the remaining amount of paper with respect to the number of sheets of paper that can be stored in the paper-supply cassette. The setting value for the remaining paper amount could also be the remaining number of sheets in the paper-supply cassette.

For paper-supply cassettes 112c and 112d, the FAX use only paper-supply stage setting is set to OFF, so can be used for supplying paper for a FAX, printing and copying regardless of the remaining paper amount in the paper-supply cassettes 112c and 112d. In the FAX use only paper-supply stage setting, in the case of paper-supply cassettes 112a to 112d that store paper 111 that is not suitable as a FAX only paper supply such as in the case of pre-printed paper (for example, paper on which a logo is printed beforehand), it is possible to fix the FAX use only paper-supply stage setting to OFF and not allow an ON setting.

Next, paper-supply control of the paper-supply cassettes 112a to 112d by the system control unit 191 will be explained with reference to FIG. 4. A case in which a FAX was received by the FAX unit 171 will be explained below. Moreover, a case in which the paper-supply cassettes 112a and 112b are set to ON, and the setting value for the remaining paper amount is set to 50% for paper-supply cassette 112a, and the setting value for the remaining paper amount is set to 80% for paper-supply cassette 112b will be explained below.

(Step S101)

The system control unit 191 determines whether or not there was a FAX reception. In this case, the system control unit 191 waits for a notification from the FAX control unit 183 (step S101: NO), and when a notification is received from the FAX control unit 183 indicating a FAX reception, the system control unit 191 determines that there was a FAX reception (step S101: YES).

(Step S102)

The system control unit 191 determines whether or not there is a FAX use only paper-supply stage that has been set to ON. In this case, when there is no notification from the panel operation control unit 189 of a FAX use only paper-supply stage that has been set to ON, the system control unit 191 determines that the there are no FAX use only paper-supply stages that have been set to ON (in other words, all of the paper-supply cassettes 112a to 112d are set to OFF) (step S102: NO), and moves to step S103.

However, when a notification is received from the panel operation control unit 189 indicating that it is possible to set a paper-supply cassette as a FAX use only paper-supply stage that is set to ON, the system control unit 191 determines that there is a FAX use only paper-supply stage that is set to ON (step S102: YES), and moves to step S104.

In this case, the panel operation control system 189 also notifies the system control unit 191 at the same time of the setting value for the remaining paper amount of the FAX use only paper-supply stage that was set to ON.

(Step S103)

When there is no FAX use only paper-supply stage that was set to ON, the system control unit 191 enables paper to be supplied from all of the paper-supply cassettes 112a to 112d for a FAX, printing and copying.

(Step S104)

The system control unit 191 determines whether or not the remaining paper amounts in the paper-supply cassettes that were set to ON are equal to or greater than the setting values. In this case, the system control unit 191 determines this based on detection results by the remaining paper detection sensors 140 that are received from the sensor control unit 188. Here, when the remaining paper amount in the paper-supply cassette 112a is less than 50%, or when the remaining paper amount in the paper-supply cassette 112b is less than 80%, the system control unit 191 determines that the remaining paper amount of at least one of the paper-supply cassettes that was set to ON is not equal to or greater than the setting value (step S104: NO), and moves to step S105.

However, when the remaining paper amount in the paper-supply cassette 112a is 50% or greater, and the remaining paper amount in the paper-supply cassette 112b is 80% or greater, the system control unit 191 determines that the remaining paper amounts in the paper-supply cassettes that were set to ON are equal to or greater than the setting values (step S104: YES), and moves to step S106.

(Step S105)

The system control unit 191 enables the ON setting for the FAX use only paper-supply stage to set FAX use only. Here, when the remaining paper amount in the paper-supply cassette 112a is less than 50%, the system control unit 191 enables the ON setting for the FAX use only paper-supply stage for paper-supply cassette 112a and sets the paper-supply cassette 112a as the FAX use only paper-supply stage so that paper is not supplied for printing and copying. At this time, when the remaining paper amount in the paper-supply cassette 112b is 80% or greater, the system control unit 191 disables the ON setting for the FAX use only paper-supply stage for the paper-supply cassette 112b, and also allows paper to be supplied for printing and copying as well as for a FAX. Moreover, when the remaining paper amount in the paper-supply cassette 112b is less than 80%, the system control unit 191 enables the ON setting for the FAX use only paper-supply stage for the paper-supply cassette 112b to set the paper-supply cassette 112b as a FAX use only paper-supply stage, and does not allow paper to be supplied for printing and copying. At this time, when the remaining paper amount in the paper-supply cassette 112a is 50% or greater, the system control unit 191 disables the ON setting for the FAX use only paper-supply stage for the paper-supply cassette 112a and also allows paper to be supplied for printing and copying as well as for a FAX.

(Step S106)

When the remaining paper amount in the paper-supply cassette 112a is 50% or greater and the remaining paper amount in the paper-supply cassette 112b is 80% or greater, the system control unit 191 disables the ON settings as FAX use only paper-supply stages for the paper-supply cassette 112a and paper-supply cassette 112b, and also allows paper to be supplied for printing and copying as well as for a FAX.

(Step S107)

When the system control unit 191 receives a notification from the FAX control unit 183 that FAX reception is complete, the system control unit 191 starts the supply of paper from one of the paper-supply cassettes 112a to 112d. Supplying paper from the paper-supply cassettes 112a to 112d is performed based on a preset order of priority, for example, from the top stage paper-supply cassette 112a.

Here, when the transporting roller unit 151 transports paper 111 to the image-forming unit 120, the secondary transfer roller 129 presses the paper 111 between the transporting roller 129 and the intermediate transfer belt 128 from rear surface side of the paper 111, and feeds the paper 111 to the fixing unit 130 while transferring a toner image that has been transferred to the intermediate transfer belt 129 onto the front surface side of the paper 111.

Then, the transporting roller units 152 and 153 transport the paper 111 that has passed the fixing unit 130 to the transporting roller unit 154 side, and the transporting roller unit 154 outputs the paper 111 to the paper-output tray 161.

By performing the supply of paper from the paper-supply cassette 112a in the top stage, the distance of the transporting path 150a from the common transporting path 110a to the paper-output tray 161 becomes short, so the speed of processing the FAX output is increased.

(Step S108)

The system control unit 191 determines whether or not FAX output is complete. In this case, when there is no notification from the image-forming control unit 182 indicating that FAX output is complete, the system control unit 191 determines that FAX output is not complete (step S108: NO), and moves to step S104. Here, "FAX output" means printing by the image-forming unit 120 according to the FAX reception.

However, when a notification has been received from the image-forming control unit 182 that FAX output is complete, the system control unit 191 determines that FAX output is complete (step S108: YES), and ends processing.

In this way, in this embodiment, when the remaining paper amount in a paper-supply cassette 112a to 112d (paper-supply stage) is detected by a remaining paper amount detection sensor 140 to be less than a fixed value, the system control unit 191 can set the paper-supply cassette 112a to 112d (paper-supply stage) having a remaining paper amount that is less than the fixed value as a FAX use only paper-supply stage.

More specifically, there is a panel unit 173 for inputting the ON/OFF setting for the FAX use only paper-supply stage, and the setting value for the remaining paper amount that sets a stage as a FAX use only paper-supply stage, and when the remaining paper amount that is detected by a remaining paper amount detection sensor 140 is less that the setting value, the system control unit 191 enables the ON setting for the respective paper-supply cassette 112a to 112d.

As a result, it is possible to perform setting of a FAX use only paper-supply stage without allowing a large decrease in the number of sheets of paper that can be supplied for copying and printing other than for a FAX, while at the same time maintaining function as a FAX use only paper-supply stage, and thus it is possible to improve the convenience to a user.

Moreover, in this embodiment, an ON setting for a FAX use only paper-supply stage is received beforehand by way of the panel unit 173, so when the remaining paper amount become less than the setting value, it is possible to make the specified paper-supply cassette 112a to 112d a FAX use only paper-supply stage.

In a typical image-forming device, when a paper-supply cassette is designated for FAX use only, the number of cassettes that can be used for printing and copying is reduced. Particularly, when there are only a few paper-supply cassettes, the number of paper-supply cassettes that can be used for printing and copying is reduced even more. Therefore, there is a problem in that the number of times that paper must be supplied increases, resulting in a decrease in the convenience for the user.

In the image-forming device of this disclosure, when the remaining paper amount in a paper-supply stage is detectedby a remaining paper amount detection sensor to be less than a fixed value, a system control unit is able to set a paper-supply stage that has an amount less than the fixed value to be a FAX use only paper-supply stage. Furthermore, in the image-forming device of this disclosure, it is possible to arbitrarily set a paper-supply stage that can be set as a FAX use only paper-supply stage.

As a result, it is possible to perform setting of a FAX use only paper-supply stage without allowing a large decrease in the number of sheets of paper that can be supplied for copying and printing other than for a FAX.

Therefore, with the image-forming device of the present disclosure, it is possible to perform setting of a FAX use only paper-supply stage without allowing a large decrease in the number of sheets of paper that can be supplied for copying and printing other than for a FAX, while at the same time maintain function as a FAX use only paper-supply stage. Therefore, it is possible to improve the convenience for a user.

In this embodiment, the case in which an ON setting for a FAX use only paper-supply stage was received beforehand was explained, however, without being limited to this, and it is also possible to set a paper-supply cassette 112a to 112d as a FAX use only paper-supply stage when the remaining paper amount becomes less than a setting value. In that case, it is possible to set an arbitrary paper-supply cassette 112a to 112d as a FAX use only paper-supply stage.

Moreover, the system control unit 191 may also perform the judgment in step S104 for each paper-supply cassette. For example, when the remaining paper amount in the paper-supply cassette 112a is less than 50% and the remaining paper amount in the paper-supply cassette 112b is 80% or more, the system control unit 191 first determines that the remaining paper amount in the paper-supply cassette 112a that is set to ON is not equal to or greater than the setting value (step S104: NO), and moves to step S105. Next, after the processing in step S105 is finished for the paper-supply cassette 112a, the system control unit 191 moves to step S104 and determines that the remaining paper amount in the paper-supply cassette 112b that was set to ON is equal to or greater than the setting value (step S104: YES) and moves to step S106. After the processing in step S106 for the paper-supply cassette 112b is finished, the system control unit 191 has finished the judgment in step S104 for all of the paper-supply cassettes that were set to ON, so the system control unit 191 moves to step S107.

Controlling the supply of paper at times other than when receiving a FAX (for example, when an image is read by the scanner unit 170 of the copying function, or when receiving printing data by the I/F 172) is performed as described below using FIG. 4.

More specifically, in step S101 in FIG. 4, the system control unit 191 determines whether or not an image was read by the scanner unit 170, or whether or not printing data was received. Next, the system control unit 191 performs the processing of steps S102 to S106.

In step S107, the system control unit 191, by way of the panel unit 173, determines whether or not a paper-supply cassette that was specified by the printing data or based on a preset order of priority is set as a FAX use only paper-supply stage. When the specified paper-supply cassette is not set as a FAX use only paper-supply stage, the system control unit 191 starts supplying paper from the specified paper-supply cassette. When the specified paper-supply cassette is set as a FAX use only paper-supply stage, the system control unit 191 specifies another paper-supply cassette or stops printing. Specifying another paper-supply cassette can be based on a preset order of priority, or can be based on a user setting that is set by way of the panel unit 173.

In step S108, the system control unit 191 determines whether or not output is complete. When there is no notification from the image-forming control unit 182 indicating that output is complete, the system control unit 191 determines that output is not complete (step S108: NO), and moves to step S104. Here, "output" refers printing by the image-forming unit 120.

However, when a notification has been received from the image-forming control unit 182 indicating that output is complete, the system control unit 191 determines that FAX output is complete (step S108: YES), and ends processing.

From this processing, it is possible to avoid using a paper-supply cassette that was set as a FAX use only paper-supply stage when the remaining paper amount becomes less than a setting value at times other than when receiving a FAX.

What is claimed is:

1. An image-forming device, comprising:
a plurality of paper-supply stages;
remaining paper amount detection sensors that detect the remaining paper amounts in the paper-supply stages; and
a system control unit, implemented by a processor and a control program, wherein the control program comprises a control program step that, only when there is a FAX reception and when a remaining paper amount of a paper-supply stage of the plurality that is detected by a remaining paper amount detection sensor is less than a setting value,
sets the paper-supply stage that has a paper amount that is less than the setting value as a FAX use only paper-supply stage, and
allows each paper stage of the plurality that has a paper amount that is detected by a remaining paper amount detection sensor as equal to or greater than the setting value to supply paper for printing and copying as well as for a FAX.

2. The image-forming device according to claim 1 further comprising
a panel unit, implemented by a touch panel for inputting an ON setting for a FAX use only paper-supply stage, and the setting value for the remaining paper amount that sets a stage as a FAX use only paper-supply stage; wherein
when the remaining paper amount that is detected by a remaining paper amount detection sensor is less than the setting value, the system control unit enables the FAX use only paper-supply stage ON setting for the paper-supply stage having a paper amount that is less than the setting value, and sets the paper-supply stage with the enabled FAX use only paper-supply stage ON setting as a FAX use only paper-supply stage.

3. The image-forming device according to claim 2, wherein
when a remaining paper amount that is detected by a remaining paper amount detection sensor is equal to or greater than the setting value, the system control unit disables the FAX use only paper-supply stage ON setting for the paper-supply stage having a paper amount that is equal to or greater than the setting value to allow the paper-supply stage having a paper amount that is equal to or greater than the setting value to supply paper for printing and copying as well as for a FAX.

4. The image-forming device according to claim 2, wherein
the panel unit is able to input an OFF setting for a FAX use only paper-supply stage; and
when the Fax use only paper-supply stage OFF setting is inputted, the system control unit is prevented from executing the control program step such that the system control unit does not set a paper-supply stage for which the FAX use only paper-supply stage OFF setting was inputted as a FAX use only paper-supply stage regardless of the remaining paper amount that was detected by the remaining paper amount detection sensor.

5. The image-forming device according to claim 1, wherein the setting value is set independently for each paper-supply stage of the plurality.

* * * * *